US 8,701,566 B2

(12) United States Patent
Matsuoka et al.

(10) Patent No.: US 8,701,566 B2
(45) Date of Patent: Apr. 22, 2014

(54) RAILCAR

(75) Inventors: Masayasu Matsuoka, Osaka (JP);
Hiroyuki Kido, Osaka (JP); Taro Hayashi, Osaka (JP); Makoto Taguchi, Kobe (JP); Yasufumi Minamimoto, Kobe (JP); Akira Ukita, Kobe (JP)

(73) Assignees: West Japan Railway Company, Osaka-Shi (JP); Kawasaki Jukogyo Kabushiki Kaisha, Kobe-Shi (JP)

( * ) Notice: Subject to any disclaimer, the term of this patent is extended or adjusted under 35 U.S.C. 154(b) by 121 days.

(21) Appl. No.: 13/256,811

(22) PCT Filed: Mar. 25, 2010

(86) PCT No.: PCT/JP2010/002151
§ 371 (c)(1),
(2), (4) Date: Nov. 8, 2011

(87) PCT Pub. No.: WO2010/109891
PCT Pub. Date: Sep. 30, 2010

(65) Prior Publication Data
US 2012/0097066 A1    Apr. 26, 2012

(30) Foreign Application Priority Data

Mar. 25, 2009 (JP) ................................. 2009-073523
Jun. 4, 2009 (JP) ................................. 2009-134634

(51) Int. Cl.
*B61D 15/06* (2006.01)
(52) U.S. Cl.
USPC ..................................... 105/392.5

(58) Field of Classification Search
USPC .......... 10/238.1, 329.1, 392.5, 393, 394, 396, 10/397, 402, 413; 105/238.1, 329.1, 105/392.5, 393, 394, 396, 397, 402, 413
See application file for complete search history.

(56) References Cited

U.S. PATENT DOCUMENTS

| 4,696,238 A | 9/1987 | Billingsley, Jr. et al. |
| 6,561,105 B2 * | 5/2003 | Godin et al. ................... 105/396 |
| 2007/0261591 A1 | 11/2007 | Bravo et al. |
| 2008/0041268 A1 | 2/2008 | Seitzberger et al. |

FOREIGN PATENT DOCUMENTS

| EP | 0 952 063 A1 | 10/1999 |
| EP | 2 011 713 A1 | 1/2009 |
| GB | 2 411 632 A | 9/2005 |
| JP | A-7-186951 | 7/1995 |
| JP | A-2000-506473 | 5/2000 |
| JP | A-2000-264203 | 9/2000 |
| JP | A-2001-48016 | 2/2001 |
| JP | A-2002-225704 | 8/2002 |

(Continued)

OTHER PUBLICATIONS

International Search Report issued in International Application No. PCT/JP2010/002151 on Jun. 15, 2010 (with translation).

(Continued)

*Primary Examiner* — R. J. McCarry, Jr.
(74) *Attorney, Agent, or Firm* — Oliff PLC (57) ABSTRACT

A railcar that includes an underframe, a front surface frame located at a front surface portion of a carbody and having a lower end portion coupled to the underframe, and a buffer member coupled to the front surface frame and extending toward a vehicle interior side. Then, the buffer member is provided at a position higher than the underframe.

12 Claims, 9 Drawing Sheets

(56) References Cited

FOREIGN PATENT DOCUMENTS

| | | |
|---|---|---|
| JP | A-2004-268694 | 9/2004 |
| JP | A-2005-53306 | 3/2005 |
| JP | A-2008-201313 | 9/2008 |
| WO | WO 2006/024059 A2 | 3/2006 |

OTHER PUBLICATIONS

Dec. 4, 2013 Search Report issued in European Patent Application No. 10755693.8.

* cited by examiner

RAILCAR

TECHNICAL FIELD

The present invention relates to a railcar including a structure configured to absorb impact energy generated by a collision.

BACKGROUND ART

Conventionally, there has been a need for a railcar having high safety against an accidental collision with, for example, a large automobile at a railway crossing. For example, PTL 1 proposes a rail vehicle configured such that: a member constituting a floor of a driver's platform of a driver's cab is a buffer floor; the buffer floor is constituted by a plurality of extruded sections having a plurality of hollow portions; a hollow section is arranged such that an extrusion direction thereof corresponds to a longitudinal direction of a carbody; and the buffer floor is provided at a position higher than the height of an underframe of the vehicle. In addition, PTL 1 explains that in accordance with the above configuration, even in a case where an obstacle collides with a portion of the vehicle which portion is located at a position higher than the underframe, the impact energy is efficiently absorbed, so that an efficient space can be adequately secured in the driver's cab.

CITATION LIST

Patent Literature

PTL 1: Japanese Laid-Open Patent Application Publication No. 2004-268694

SUMMARY OF INVENTION

Technical Problem

However, since the buffer floor of the rail vehicle described in PTL 1 corresponds to a floor surface portion of the driver's platform, the floor surface of the driver's platform is an upper limit of a height position of the buffer floor. Therefore, the height position of the buffer floor is not significantly different from the height position of the underframe, and the buffer floor is not provided at a high position. On this account, for example, if a large truck mounting a cargo and the rail vehicle described in PTL 1 collide with each other, the position of the buffer floor (floor surface portion) of the rail vehicle may be lower than the height position of the falling cargo. In this case, a large impact load is applied to a position higher than the buffer floor of the rail vehicle, so that the impact energy may not be adequately absorbed only by the buffer floor.

Here, an object of the present invention is to provide a railcar configured to have further improved safety even in a case where the railcar receives the large impact load at a position higher than the floor surface portion of the carbody.

Solution to Problem

The present invention was made to solve the above problems, and a railcar according to the present invention includes: an underframe; a front surface frame located at a front surface portion of a carbody and having a lower end portion coupled to the underframe; and a buffer member coupled to the front surface frame and extending toward a vehicle interior side, wherein the buffer member is provided at a position higher than the underframe.

In accordance with this configuration, even if a large impact load is applied to the railcar at a position higher than the floor surface portion of the carbody, the buffer member provided at a position higher than the underframe can efficiently absorb the impact energy.

Advantageous Effects of Invention

In accordance with the railcar of the present invention, it is possible to provide a railcar having further improved safety even in a case where the railcar receives a large impact load at a position higher than the floor surface portion of the carbody.

DESCRIPTION OF EMBODIMENTS

Hereinafter, embodiments of the present invention will be explained in reference to the drawings. In the following, the same reference signs are used for the same or corresponding components in the drawings, and a repetition of the same explanation is avoided.

Embodiment 1

Figure 1:
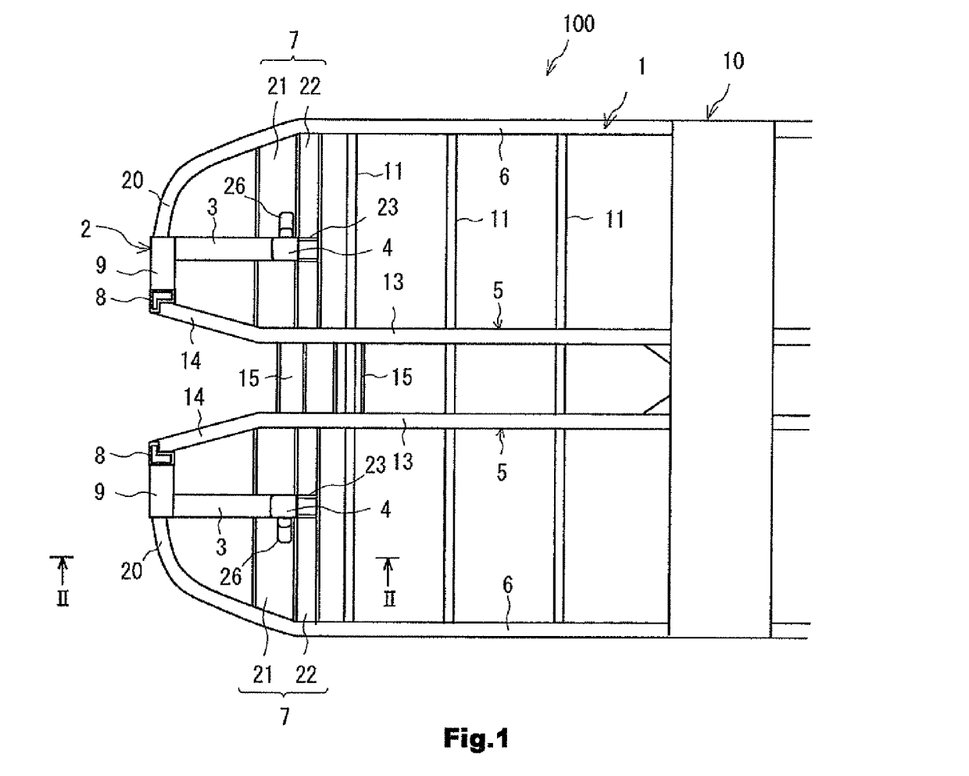
FIG. 1 is a plan view showing portions, such as an underframe, of a railcar according to Embodiment 1 of the present invention.

First, a railcar 100 according to Embodiment 1 of the present invention will be explained in reference to FIGS. 1 to 7. The railcar 100 according to the present embodiment is a vehicle including a driver's cab at a front portion thereof. FIG. 1 is a plan view showing portions, such as an underframe 1, of the railcar 100 according to the present embodiment. FIG. 1 shows only the front portion of the railcar 100, and a floor panel 12 (see FIG. 2) is not shown. As shown in FIG. 1, the railcar 100 according to the present embodiment includes the underframe 1, a front surface frame 2, a buffer member 3, and a supporting member 4. Further, the underframe 1 includes center sills 5, side sills 6, cross beams 7, and end beams 20. The front surface frame 2 includes a collision post 8 that is a gangway post, and an extension member 9. Hereinafter, these components will be explained in order. The following will be explained on the basis that a front surface side (left side in FIG. 1) of the railcar 100 is defined as a front side, a vehicle interior side (right side in FIG. 1) when viewed from the front surface is defined as a rear side, a right side (upper side in FIG. 1) when facing the front side is defined as a right side, and a left side (lower side in FIG. 1) when facing the front side is defined as a left side.

Figure 2:
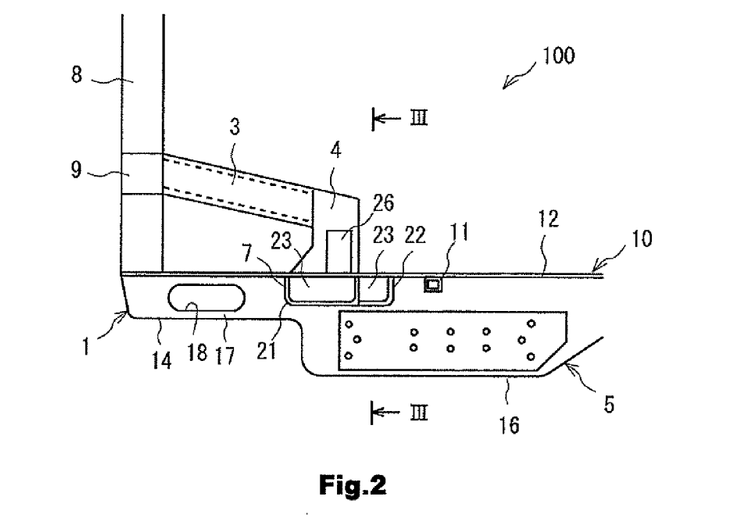
FIG. 2 is a diagram showing a cross section taken along line II-II of FIG.

The underframe 1 includes the center sills 5, the side sills 6, the cross beams 7, and the end beams 20. In the present embodiment, these components are symmetrically arranged. The shape of each of the components (portions) located on the right side is symmetrical to the shape of each of the components (portions) located on the left side. Moreover, the underframe 1 includes a plurality of floor beams 11 each extending from one of the side sills 6 to the other side sill 6 in a left-right direction. FIG. 2 is a diagram showing a cross section taken along line II-II of FIG. 1. As shown in FIG. 2, the floor beams 11 are located near an upper end of the underframe 1 and support the floor panel 12 together with the other beams.

The center sill 5 is a member located at a substantially center portion of the underframe 1 in the left-right direction and extending in a front-rear direction. As shown in FIG. 1, the center sill 5 includes a straight portion 13 extending in the front-rear direction and an inclined portion 14 extending from a front end of the straight portion 13 to incline toward an outer side in the left-right direction. Front portions of the straight portions 13 of the left and right center sills 5 are coupled to each other by two coupling beams 15. Moreover, the railcar 100 according to the present embodiment is configured such that a coupler (not shown) configured to couple the railcar 100 with the other railcar can be attached to the railcar 100. A coupler attaching portion 16 to which the coupler is attached is formed at the straight portion 13 of the center sill 5. The coupler attaching portion 16 projects downward, is formed to have a larger vertical size than the other members, such as the inclined portion 14, and has high stiffness. Moreover, the inclined portion 14 of the center sill 5 includes a bending accelerating portion 17. The bending accelerating portion 17 is configured such that a cross-sectional area of a cross section thereof perpendicular to the front-rear direction is smaller than that of an adjacent portion. Specifically, an elongated hole 18 extending in the left-right direction is formed at the inclined portion 14 of the center sill 5, and the bending accelerating portion 17 is constituted by portions including the elongated hole 18.

The side sill 6 is a member located on the outer side in the left-right direction and extending in the front-rear direction in the underframe 1. In the present embodiment, the side sill 6 is formed in a straight shape except for a front portion thereof, and the front portion is formed in a curved shape (bent shape). A tip end of the side sill 6 is formed to be connected to the end beam 20.

The end beam 20 is a member located at a front portion and extending in the left-right direction in the underframe 1. In the present embodiment, the end beam 20 is formed to be connected to the tip end of the side sill 6. An inner portion of the end beam 20 in the left-right direction is coupled to a front end portion of the inclined portion 14 of the center sill 5 and the collision post 8. The side sill 6 and the end beam 20 may be constituted as different members or may be constituted integrally.

Figure 3:
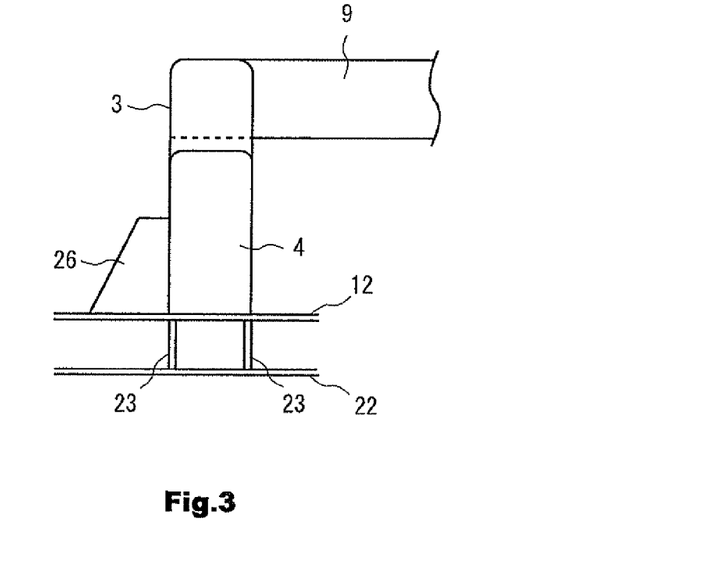
FIG. 3 is a diagram showing a cross section taken along line of FIG. 2.

The cross beam 7 is a member extending in the left-right direction and coupling the center sill 5 and the side sill 6. The cross beam 7 is constituted by a main member 21 located on the front side and an auxiliary member 22 located on the rear side. The auxiliary member 22 is coupled to the main member 21 in order to increase the stiffness of the entire cross beam 7. Moreover, as shown in FIG. 2, in order to further increase the stiffness, the main member 21 is formed to have a U-shaped cross section, and the auxiliary member 22 is formed to have an L-shaped cross section. The supporting member 4 is fixed to the main member 21 via the floor panel 12, and a front-rear size of a lower end of the supporting member 4 and a front-rear size of the main member 21 are the same as each other. FIG. 3 is a diagram showing a cross section taken along line III-III of FIG. 2. As shown in FIG. 3, each of the main member 21 and the auxiliary member 22 includes therein a reinforcing board member 23. The reinforcing board member 23 is a plate-shaped member extending in a direction perpendicular to the left-right direction, and is provided at each of positions corresponding to both left and right ends of the supporting member 4. With this configuration, the stiffness of a portion of the cross beam 7 can be increased, the portion being a portion to which the supporting member 4 is fixed. In addition, the supporting member 4 can be strongly fixed to the cross beam 7.

The front surface frame 2 is a member located at a front surface portion of a carbody 10. As above, the front surface frame 2 includes the collision post 8 and the extension member 9. The collision posts 8 are symmetrically arranged, and the extension members 9 are symmetrically arranged. In addition, the shape of each of the collision post 8 and extension member 9 located on the right side is symmetrical to the shape each of the collision post 8 and extension member 9 located on the left side.

Figure 4:
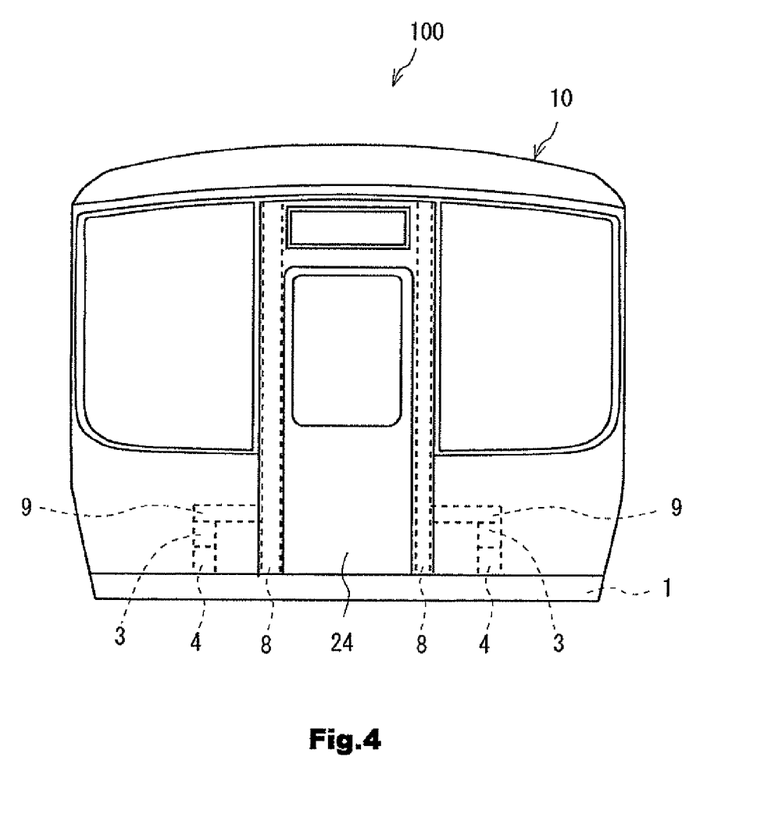
FIG. 4 is a front view showing the railcar shown in FIG. 1.

The collision post 8 is a gangway post located at a center portion in the left-right direction and extending in a vertical direction in the front surface frame 2. FIG. 4 is a front view showing the railcar 100 according to the present embodiment. As shown in FIG. 4, the railcar 100 according to the present embodiment includes a gangway door 24 at the front surface portion thereof. The gangway door 24 is provided to allow passengers to enter or leave through the front surface portion when, for example, the railcar 100 is coupled to the other railcar. The collision posts 8 are located on both left and right sides of the gangway door 24 and also serves as frame members for the gangway door 24. As above, a lower end of the collision post 8 is fixed to the end beam 20. An upper end portion of the collision post 8 is coupled to an upper portion of the carbody 10. Further, as shown in FIG. 1, the collision post 8 is formed in a tubular shape and has an L-shaped frame-shaped cross section such that the gangway door 24 can be attached thereto.

Figure 5:
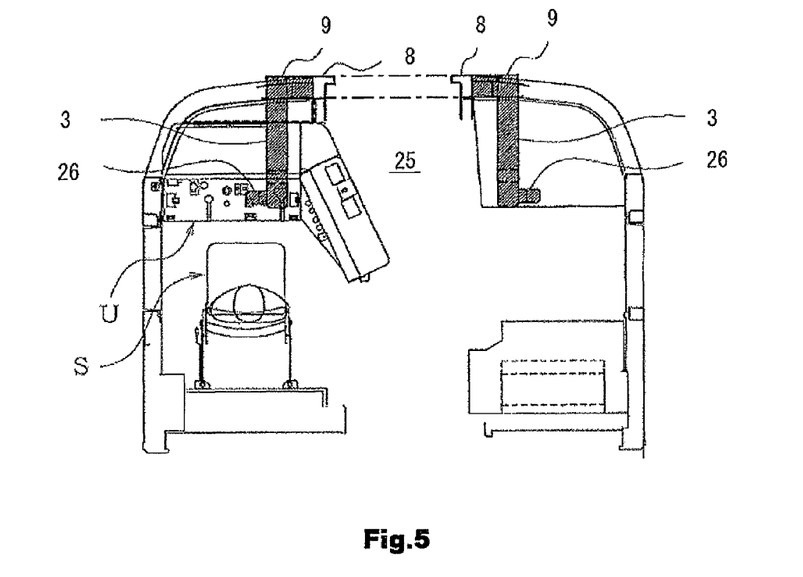
FIG. 5 is a diagram showing a positional relation among a driver's seat, a driver's cab instrument unit, a buffer member, and the like arranged in the driver's cab of the railcar shown in FIG. 1, when viewed from above.
Figure 6:
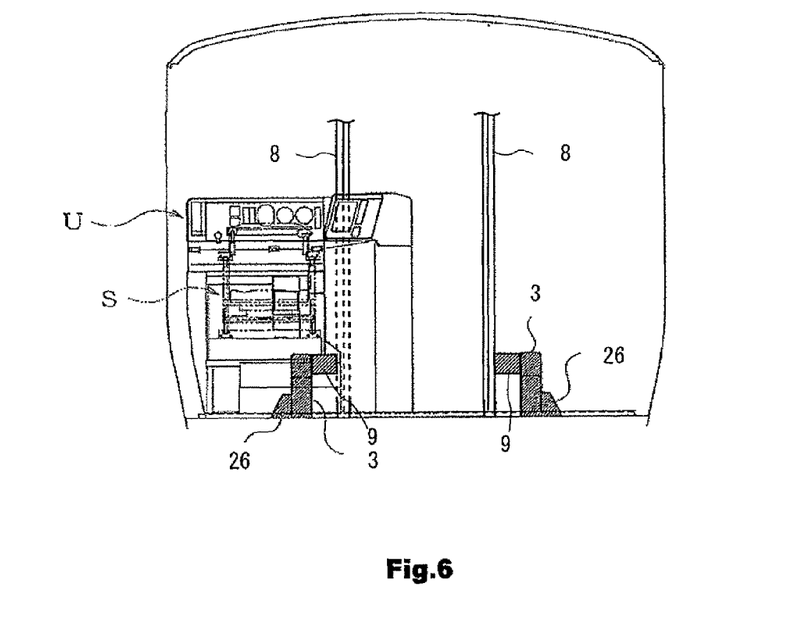
FIG. 6 is a diagram showing the positional relation among the driver's seat, the driver's cab instrument unit, the buffer member, and the like arranged in the driver's cab of the railcar shown in FIG. 1, when viewed from a rear side.
Figure 7:
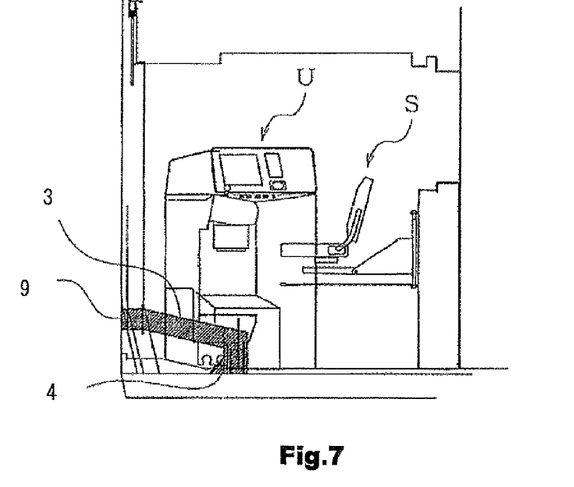
FIG. 7 is a diagram showing the positional relation among the driver's seat, the driver's cab instrument unit, the buffer member, and the like arranged in the driver's cab of the railcar shown in FIG. 1, when viewed from a left side.

The extension member 9 is a member coupled to the collision post 8 and extending toward the outer side in the left-right direction in the front surface frame 2. As shown in FIG. 4, an inner portion of the extension member 9 in the left-right direction is coupled to the collision post 8. Moreover, an outer portion of the extension member 9 in the left-right direction is coupled to the buffer member 3. Further, as shown in FIG. 2, the extension member 9 is formed in a tubular shape and has a rectangular frame-shaped cross section. Here, each of FIGS. 5 to 7 is a diagram showing a positional relation among a driver's seat S, a driver's cab instrument unit U, the buffer member 3, and the like in the driver's cab. FIG. 5 is a diagram showing the positional relation when viewed from above, FIG. 6 is a diagram showing the positional relation when viewed from the rear side, and FIG. 7 is a diagram showing the positional relation when viewed from the left side. As shown in FIG. 5, the railcar 100 according to the present embodiment includes a gangway 25 formed on a rear side of the collision post 8 (gangway door 24) and between the driver's cab instrument units U located on the left and right sides. The gangway 25 is a passage when the gangway door 24 is an entrance door. If the buffer member 3 is directly coupled to the collision post 8, the width of the gangway 25 is limited by the buffer member 3. However, as in the present embodiment, the buffer member 3 is coupled to the collision post 8 via the extension member 9, so that the gangway 25 can be widely fanned.

The buffer member 3 is a member configured to absorb impact energy generated when the railcar 100 collides. As shown in FIG. 2, a front portion of the buffer member 3 is coupled to the extension member 9 at a position higher than the underframe 1. To be specific, in the present embodiment, the buffer member 3 is coupled to the collision post 8 via the extension member 9 at a position higher than the underframe 1. Moreover, the buffer member 3 has a tubular shape and a substantially square cross section. A frame thickness of the buffer member 3 in this cross section is determined such that the buffer member 3 collapses in an axial direction when a certain collision load or larger is applied to the buffer member 3 in the axial direction. The buffer member 3 may be configured to have a circular frame-shaped cross section, for example. However, it is desirable that the cross section be a square frame shape. This is because in a case where the buffer member 3 is configured to have a square frame-shaped cross section, and a large load is applied to the buffer member 3 in the axial direction, surfaces located on the upper and lower sides and surfaces located on the left and right sides are alternately bent in the axial direction, and the buffer member 3 linearly collapses along the axial direction as a whole, so that the impact energy can be efficiently absorbed. Further, the buffer member 3 is disposed such that a front portion (front surface side end portion) thereof is higher in position than a rear portion (vehicle interior side end portion) thereof. Effects obtained by this configuration will be described below. The buffer member 3 is not limited to the above, and for example, the other member, such as a damper, may be used as the buffer member.

The supporting member 4 is a member configured to support the buffer member 3. As shown in FIG. 2, the supporting member 4 has the lower end fixed to the underframe 1 (cross beam 7) via the floor panel 12 and an upper portion coupled to the buffer member 3. To be specific, the supporting member 4 supports the rear portion of the buffer member 3 at a position higher than the underframe 1. Moreover, the front-rear size of the upper portion of the supporting member 4 is constant, the upper portion being a portion supporting the buffer member 3. However, a portion of the supporting member 4 which portion extends from its center to the lower side in the vertical direction is formed such that as this portion of the supporting member 4 extends to the lower side, a front end edge of this portion is located forward and the front-rear size of this portion increases in size. To be specific, the supporting member 4 is formed such that the front-rear size of the lower end fixed to the underframe 1 is the largest. With this configuration, the supporting member 4 can be strongly fixed to the underframe 1 (the cross beam 7) over a large area, and a space under the buffer member 3 can be efficiently utilized. It is desirable that the supporting member 4 have the above shape. However, the supporting member 4 may be configured such that the front-rear size thereof may be constant regardless of the vertical position, that is, the surfaces located on the front and rear sides are parallel to each other. Further, a lateral falling preventing member 26 is attached to an outer surface of the supporting member 4 in the left-right direction in order to prevent the supporting member 4 from falling in the left-right direction. As shown in FIG. 3, the lateral falling preventing member 26 is formed such that its left-right size increases toward the lower side. Moreover, as shown in FIG. 7, the supporting member 4 is located inside the driver's cab instrument unit U and forward of the driver's seat S.

The foregoing has explained respective components of the railcar 100 according to the present embodiment.

In a case where the railcar 100 having the above configuration collides with an obstacle at a position higher than the floor surface portion (underframe 1) of the carbody 10, the impact energy generated by the collision is absorbed as below. First, the obstacle collides with the front surface portion of the carbody 10, and an impact load from the front side by this collision is applied to the collision post 8. Then, in a case where this impact load is a certain load or larger, an upper portion of the carbody 10 deforms to absorb the impact energy, the collision post 8 falls to the rear side using a coupled portion with the underframe 1 as a fulcrum while deforming to absorb the impact energy, and the impact load is applied to the buffer member 3 supporting the collision post 8 via the extension member 9. Then, the buffer member 3 collapses in the axial direction by the impact load applied from the collision post 8. Thus, the impact energy is absorbed. As above, in the present embodiment, the impact energy is not absorbed only by a vehicle upper portion or the collision post 8, but the impact energy is absorbed also by the buffer member 3 supporting the collision post 8, so that the deformation of the vehicle front portion can be reduced as compared to a case where the buffer member 3 is not provided. Therefore, a remaining space of the driver's cab after the collision is maintained, so that the safety for a driver can be further improved. Further, in the present embodiment, since the falling collision post 8 is supported by the buffer member 3, the impact energy is comparatively moderately absorbed by the buffer member 3, so that impact acceleration to the passengers can be reduced.

At the time of the collision as above, the collision post 8 falls to the rear side to be inclined, so that the load is applied to the buffer member 3 in an obliquely downward direction. Here, since the buffer member 3 of the present embodiment is disposed such that the front portion thereof is higher in position than the rear portion thereof, the impact load is applied to the buffer member 3 in the axial direction, so that the buffer member 3 can efficiently absorb the impact energy. Further, since the buffer member 3 is disposed such that the front portion thereof is higher in position than the rear portion thereof, a part of the impact load can be converted into a load in a vertically downward direction. With this, a shear force generated between the lower end of the supporting member 4 and the underframe 1 (cross beam 7) can be reduced, and the supporting member 4 can be prevented from falling from the underframe 1, (cross beam 7). Moreover, since a part of the impact load is converted into the load in the downward direction, the cross beam 7 deforms by the load, so that the impact energy can be absorbed also by the cross beam 7.

Moreover, at the time of the collision, as the collision post 8 inclines using the coupling portion with the underframe 1 as a fulcrum, a force in the upper direction is generated at the front portion of the underframe 1 by the collision post 8. As described above, the elongated hole 18 extending in the left-right direction is formed at the inclined portion 14 of the center sill 5 in the present embodiment (see FIG. 2). To be specific, the center sill 5 includes the bending accelerating portion 17 at its front portion (inclined portion 14). With this, at the time of the collision, the front portion of the underframe 1 receives the force in the upper direction, and the underframe 1 deforms at about the bending accelerating portion 17 of the center sill 5, so that the front portion of the underframe 1 can also absorb the collision energy. The present embodiment is not limited to a case where the bending accelerating portion 17 is formed to include the elongated hole 18. For example, the bending accelerating portion 17 may be formed to include a plurality of holes, each of which is smaller than the elongated hole 18, on the inclined portion 14 of the center sill 5, or the bending accelerating portion 17 may be formed to include a cutout on an upper surface of the inclined portion 14 of the center sill 5.

Further, as shown in FIG. 7, since the supporting member 4 supports the buffer member 3 at a position forward of the driver's seat S, the carbody 10 deforms only forward of the driver's seat S, and the deformation of the carbody 10 is suppressed at a position rearward of the driver's seat S, so that the safety for the driver and the passengers can be further improved.

In the present embodiment, a deformable area (first impact absorbing region) of the upper portion of the carbody 10 is provided above the driver's seat S, so that the deformation of an upper space of the driver's Gab can be caused, and the impact energy can be absorbed. In addition, the buffer member 3 is provided at a position higher than the underframe 1 and forward of the driver's seat (second impact absorbing region) to absorb the impact energy. With this, even if a large impact load is applied to a position higher than the underframe 1, the impact energy can be efficiently absorbed, and the remaining space after the collision can be secured. As above, the railcar according to the present embodiment includes a crushable zone which causes the deformation by the collision to absorb the energy and a survival zone which suppresses the deformation to secure the space, so that the safety at the time of the collision can be further improved.

As above, in accordance with the railcar 100 of the present embodiment, even if the railcar 100 receives the large impact load at a position higher than the floor surface portion (underframe 1) of the carbody 10, the impact energy can be absorbed by the buffer member 3 and the like, so that the deformation of the vehicle front portion can be reduced. Thus, the safety against the collision can be further improved.

Moreover, in accordance with the railcar 100 of the present embodiment, the impact acceleration by the collision can be reduced, and the deformation of a passenger vehicle can be reduced.

In the present embodiment, in order to efficiently absorb the collision energy, the thickness of a certain area of the upper portion of the carbody may be set to be smaller than a rear region of the upper portion of the carbody.

Moreover, in the present embodiment, by the impact load from the collision post 8, the upper portion of the carbody, which is relatively low in strength, may start deforming at first, and the buffer member 3 may then deform.

Embodiment 2

Figure 9:
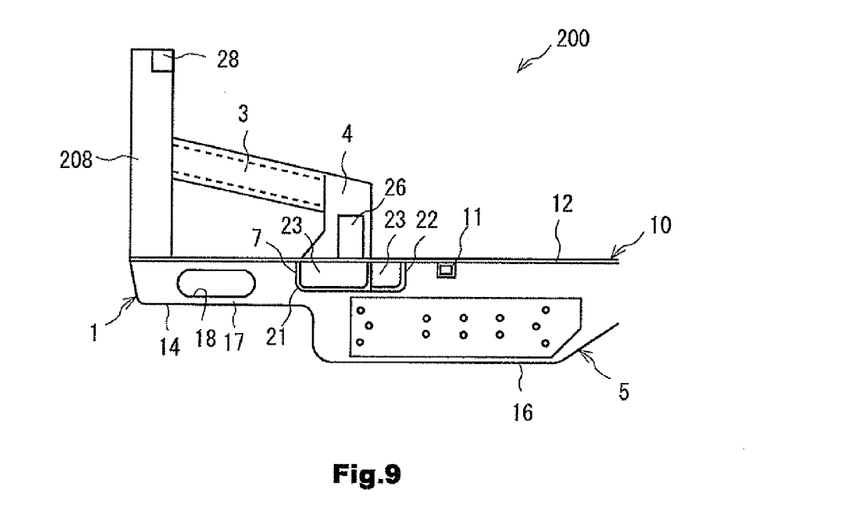
FIG. 9 is a diagram showing a cross section taken along line IX-IX of FIG. 8.
Figure 10:
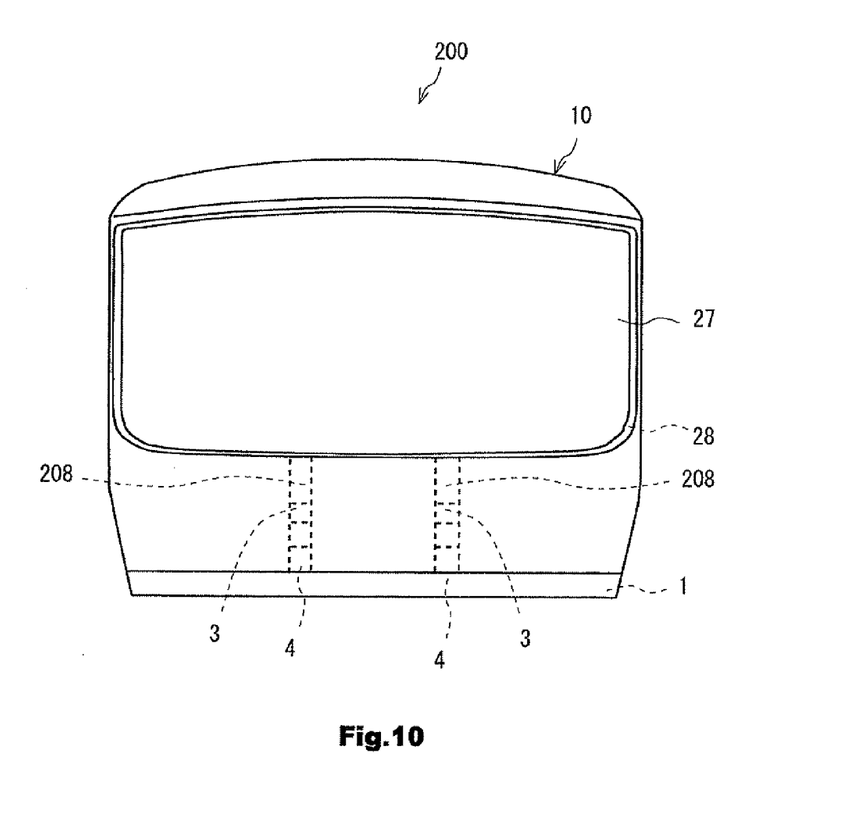
FIG. 10 is a front view showing the railcar shown in FIG. 8.
Figure 11:
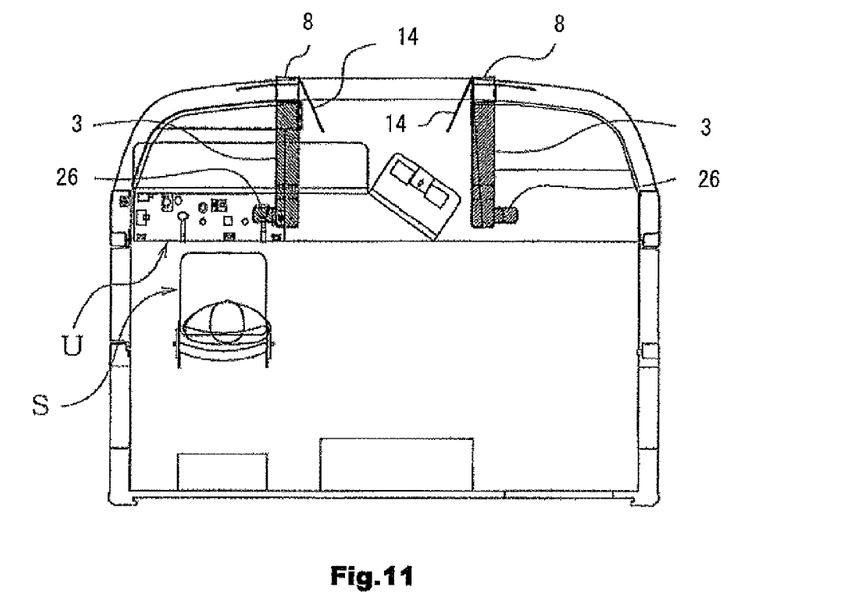
FIG. 11 is a diagram showing the positional relation among the driver's seat, the driver's cab instrument unit, the buffer member, and the like arranged in the driver's cab of the railcar shown in FIG. 8, when viewed from above.
Figure 12:
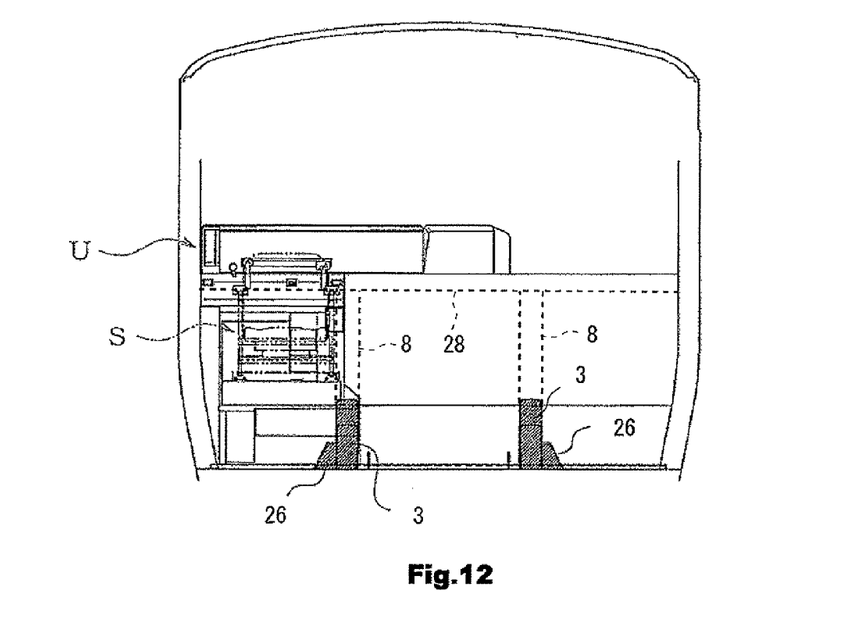
FIG. 12 is a diagram showing the positional relation among the driver's seat, the driver's cab instrument unit, the buffer member, and the like arranged in the driver's cab of the railcar shown in FIG. 8, when viewed from the rear side.
Figure 13:
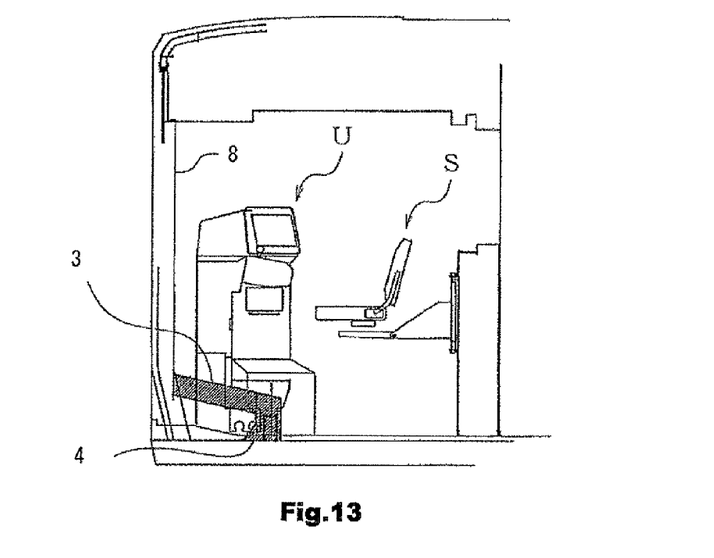
FIG. 13 is a diagram showing the positional relation among the driver's seat, the driver's cab instrument unit, the buffer member, and the like arranged in the driver's cab of the railcar shown in FIG. 8, when viewed from the left side.

Next, a railcar 200 according to Embodiment 2 of the present invention will be explained in reference to FIGS. 8 to 13. FIGS. 8 to 13 respectively correspond to FIGS. 1, 2, and 4 to 7 of Embodiment 1. As shown in FIGS. 10 and 11, the railcar 200 according to the present embodiment is different in configuration from the railcar 100 according to Embodiment 1 in that the gangway door 24 (see FIG. 4) and the gangway 25 (see FIG. 5) are not included. Hereinafter, components of the railcar 200 of the present embodiment, which are different from those of Embodiment 1, will be mainly explained while comparing with those of Embodiment 1.

Figure 8:
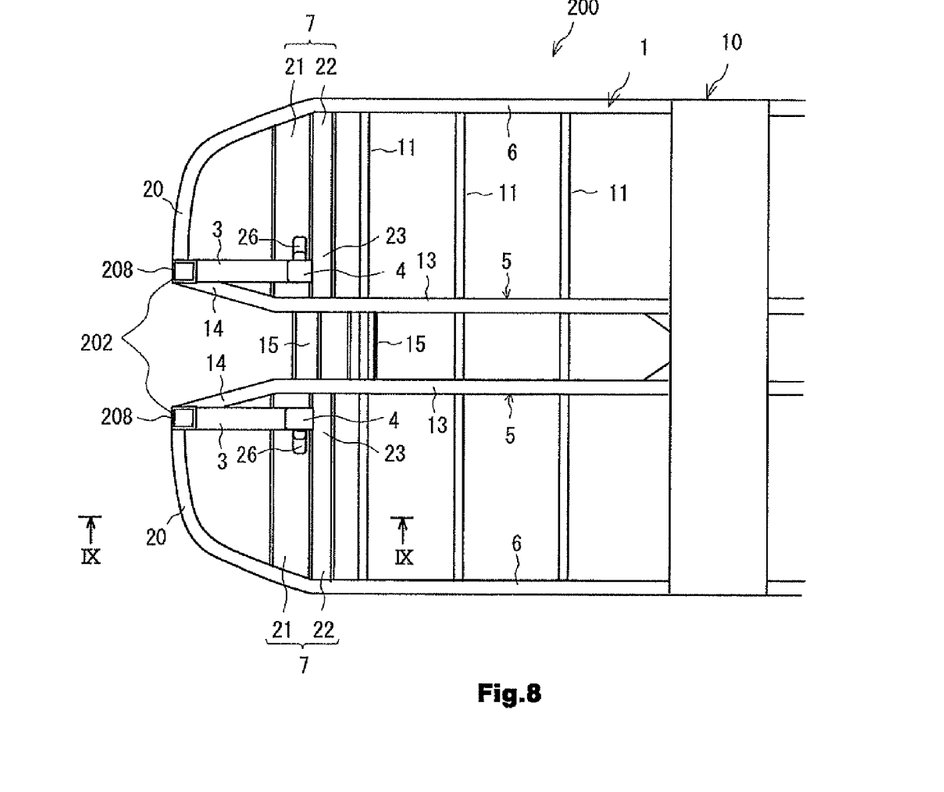
FIG. 8 is a plan view showing portions, such as the underframe, of the railcar according to Embodiment 2 of the present invention.

As shown in FIG. 8, a front surface frame 202 of the present embodiment is different from that of Embodiment 1 in that a collision post 208 is included but the extension member 9 (see FIG. 1) is not included. The reason why the front surface frame 202 does not include the extension member 9 in the present embodiment is because the railcar 200 according to the present embodiment does not include the gangway door 24 and the gangway 25(see FIG. 5). To be specific, in the present embodiment, it is unnecessary to secure the width of the gangway 25 by, for example, widening an interval between the buffer members 3 located on the left and right sides by using the extension member 9. Further, as shown in FIG. 10, the railcar 200 according to the present embodiment includes a window portion 27 which occupies a large part of an upper portion of the front surface portion. Therefore, the collision post 208 is located under the window portion 27, and a vertical size thereof is smaller than that of the collision post 8 (see FIG. 4) of Embodiment 1. Moreover, as shown in FIG. 8, the collision post 208 is formed in a tubular shape. However, since it is unnecessary to attach the gangway door 24, a cross section of the collision post 208 is a rectangular frame shape. As shown in FIG. 9, a window frame 28 is attached to upper portions of the collision posts 208 located on the left and right sides.

In the present embodiment, the buffer member 3 is directly coupled to the collision post 208 without via the extension member 9. Therefore, the buffer member 3 is located on an inner side in the left-right direction as compared to Embodiment 1. With this, the supporting member 4 is also located on an inner side in the left-right direction as compared to Embodiment 1. In a case where it is unnecessary to secure the gangway 25 as in the present embodiment, the lateral falling preventing member 26 may be attached to each of both left and right surfaces of the supporting member 4, although the lateral falling preventing member 26 is attached to only the outer surface of the supporting member 4 in the left-right direction in Embodiment 1.

In accordance with the railcar 200 of the present embodiment, in a case where the railcar 200 collides with an obstacle at a position higher than the floor surface portion (underframe 1) of the carbody 10, the buffer member 3 directly receives the impact load from the collision post 208, but as with Embodiment 1, the impact energy generated by the collision can be absorbed mainly by the buffer member 3, and the deformation of the vehicle front portion can be reduced, so that the safety against the collision can be further improved. Moreover, in accordance with the present embodiment, since the buffer member 3 is directly coupled to the collision post 208, the buffer member 3 can more surely receive the impact load from the collision post 208, so that the buffer member 3 can efficiently absorb the impact energy.

Embodiment 3

Figure 16:
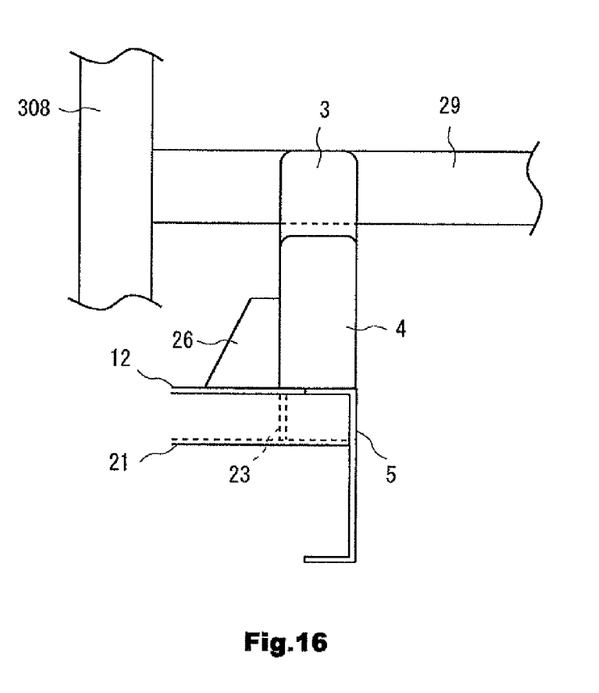
FIG. 16 is a diagram showing a cross section taken along line XVI-XVI of FIG. 15.
Figure 17:
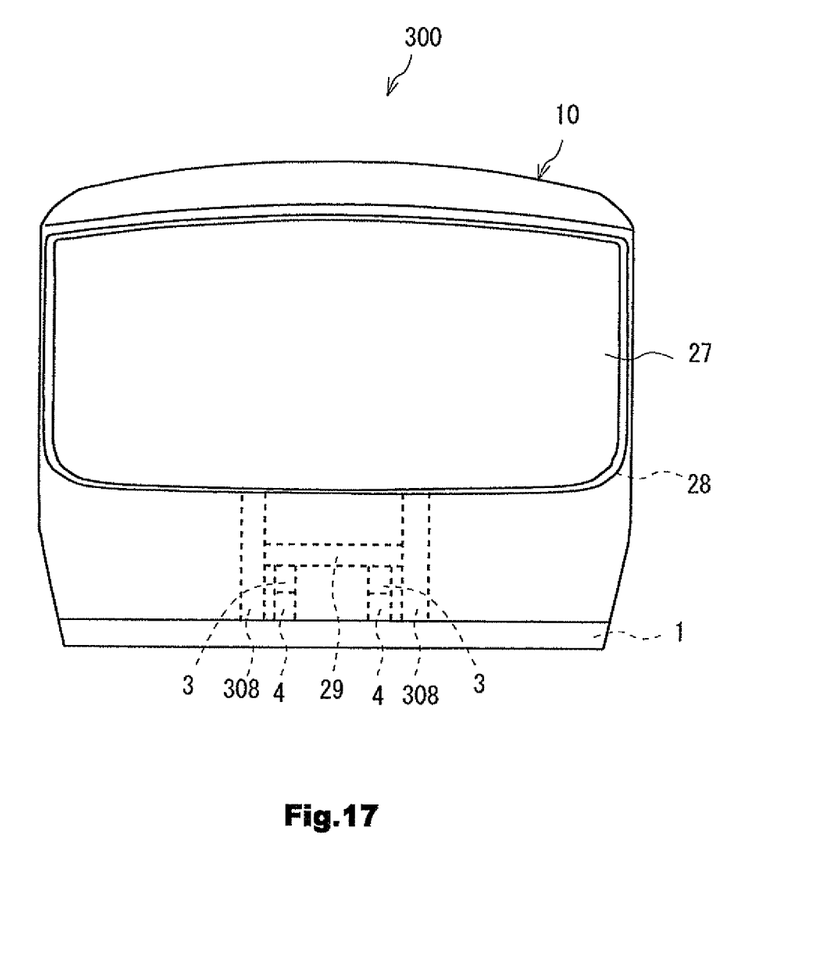
FIG. 17 is a front view showing the railcar shown in FIG. 14.

Next, a railcar 300 according to Embodiment 3 of the present invention will be explained in reference to FIGS. 14 to 17. FIGS. 14 to 17 respectively correspond to FIGS. 1 to 4 of Embodiment 1. As shown in FIG. 17, as with Embodiment 2, the railcar 300 according to the present embodiment is different in configuration from the railcar 100 according to Embodiment 1 in that the gangway door 24 (see FIG. 4) and the gangway 25(see FIG. 5) are not included. Moreover, the railcar 300 according to the present embodiment is also different in configuration from the railcar 200 according to Embodiment 2 in that a front surface frame 302 includes a side post member 29. Hereinafter, components of the railcar 300 of the present embodiment, which are different from those of Embodiment 2, will be mainly explained while comparing with those of Embodiment 2.

As shown in FIG. 17, the front surface frame 302 of the present embodiment includes the side post member 29 which is not included in the front surface frame 202 of Embodiment 2. The side post member 29 is a member configured to couple the left and right collision posts 308 in the vicinity of a vertically center portion of each of the collision posts 308. The side post member 29 has a tubular shape, and a cross section thereof is a rectangular frame shape. Moreover, a front-rear size (width) of the side post member 29 is the same as a front-rear size of the collision post 308. Thus, in the present embodiment, the left and right collision posts 308 are strongly coupled to each other.

Figure 14:
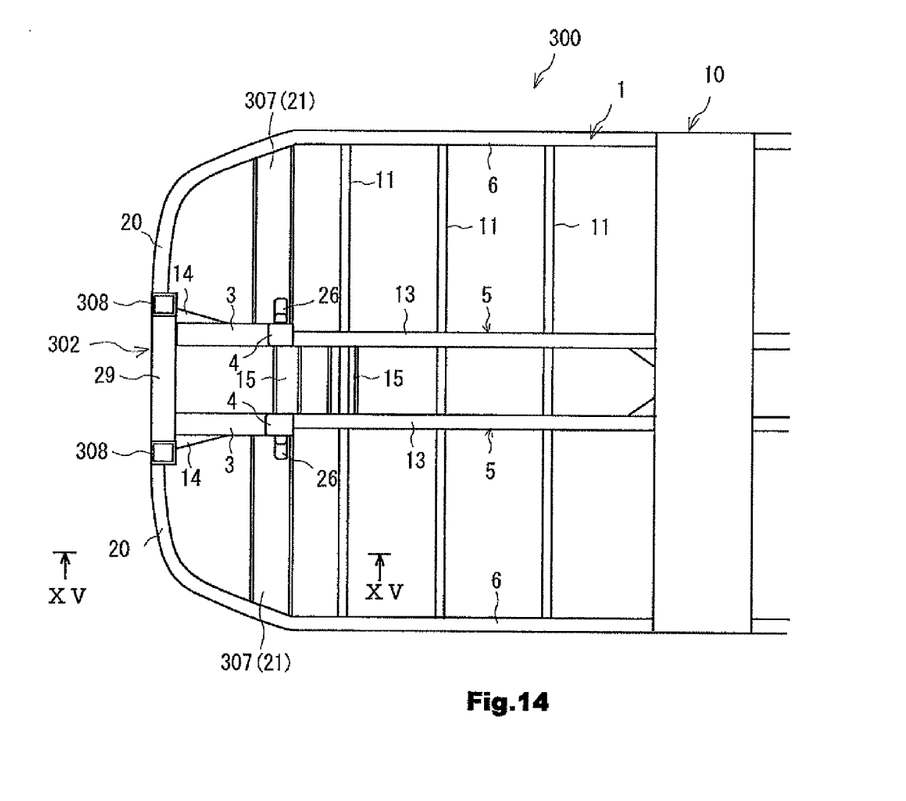
FIG. 14 is a plan view showing portions, such as the underframe, of the railcar according to Embodiment 3 of the present invention.
Figure 15:
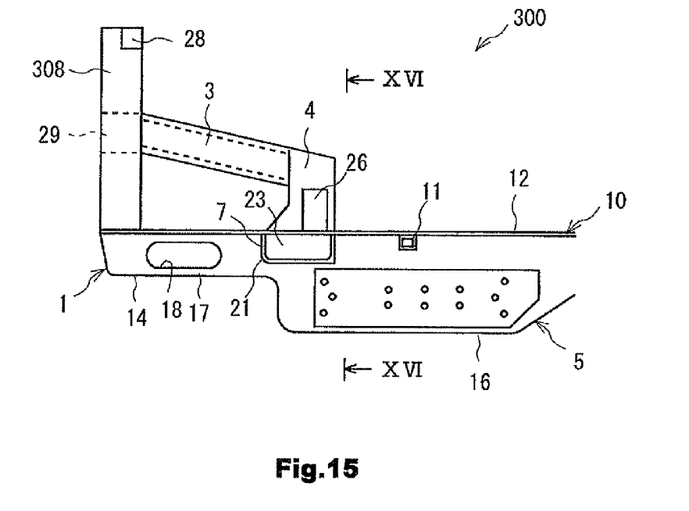
FIG. 15 is a diagram showing a cross section taken along line XV-XV of FIG. 14.

Moreover, as shown in FIG. 14, the buffer member 3 of the present embodiment is not directly coupled to the collision post 308 but is coupled to the collision post 308 via the side post member 29. Therefore, the buffer member 3 is located on a further inner side in the left-right direction as compared to Embodiment 2. With this, as shown in FIG. 16, the supporting member 4 is also located on a further inner side in the left-right direction as compared to Embodiment 2. More specifically, an inner side portion of the supporting member 4 in the left-right direction is fixed to the center sill 5, and an outer side portion thereof is fixed to a cross beam 307. By fixing a part of the supporting member 4 to the center sill 5, the supporting member 4 can be strongly fixed to the underframe 1. Therefore, the cross beam 307 does not include the auxiliary member 22 (see FIG. 1, for example) included in each of Embodiments 1 and 2, and is constituted only by the main member 21. Moreover, as shown in FIG. 16, since the inner side portion of the supporting member 4 in the left-right direction is fixed to the center sill 5, the reinforcing board member 23 is provided only at a position corresponding to an inner end edge of the supporting member 4 in the left-right direction in the main member 21.

In accordance with the railcar 300 of the present embodiment, in a case where the railcar 300 collides with an obstacle at a position higher than the floor surface portion (underframe 1) of the carbody 10, the buffer member 3 directly receives the impact load from the collision post 308 via the side post member 29, but as with Embodiments 1 and 2, the impact energy by the collision can be adequately absorbed mainly by the buffer member 3, and the deformation of the carbody front portion can be reduced, so that the safety against the collision can be further improved. Moreover, in accordance with the present embodiment, the left and right collision posts 308 are strongly coupled to each other by the side post member 29. Therefore, even if the impact load is applied to one of the collision posts 308, the load is applied to both collision posts 308, so that the impact energy can be absorbed by both left and right buffer members 3. Further, since the supporting member 4 is fixed to the center sill 5 having high stiffness, the supporting member 4 can more stably support the buffer member 3.

The foregoing has explained the embodiments of the present invention in reference to the drawings. However, specific configurations are not limited to these embodiments, and design modifications and the like within the spirit of the present invention are included in the present invention. For example, the foregoing has explained a case where the front portion of the buffer member 3 is coupled to the extension member 9, the collision post 208, or the side post member 29. However, the present invention is not limited to this, and the present invention includes a case where the front portion of the buffer member 3 is coupled to the other member constituting the front surface frame.

Industrial Applicability

In accordance with the railcar of the present invention, the safety can be further improved in the case of the collision in which the large impact load is applied at a position higher than the floor surface portion of the carbody. Therefore, the present invention is useful in a technical field of railcars.

Reference Signs List 1 underframe
2, 202, 302 front surface frame
3 buffer member
4 supporting member
5 center sill
6 side sill
7, 307 cross beam
8, 208, 308 collision post
9 extension member
10 carbody
17 bending accelerating portion
20 end beam
23 reinforcing board member
26 lateral falling preventing member
29 side post member
100, 200, 300 railcar

The invention claimed is:

1. A railcar comprising:
an underframe;
a front surface frame located at a front surface portion of a carbody and having a lower end portion coupled to the underframe; and
a buffer member coupled to the front surface frame and extending from the front surface frame toward a vehicle interior side, wherein:
the buffer member is provided at a position higher than the underframe; and
the buffer member is provided to incline such that a front surface side portion thereof is higher in position than a vehicle interior side portion thereof.

2. The railcar according to claim 1, further comprising a supporting member fixed to the underframe and configured to support a vehicle interior side end portion of the buffer member, wherein
the supporting member is formed such that a front-rear size of a portion of the supporting member which portion is fixed to the underframe is larger than a front-rear size of a portion of the supporting member which portion supports the buffer member, and a front end edge of the portion of the supporting member which portion is fixed to the underframe is located forward of a front end edge of the portion of the supporting member which portion supports the buffer member.

3. The railcar according to claim 1, wherein the buffer member has a tubular shape of a rectangular frame-shaped cross section and is configured so as to collapse in an axial direction if a certain collision load or larger is applied in the axial direction.

4. The railcar according to claim 1, wherein the front surface frame includes a collision post extending in a vertical direction and having a lower end portion fixed to the underframe, and the buffer member is coupled to the collision post.

5. The railcar according to claim 1, wherein the front surface frame includes a collision post extending in a vertical direction and having a lower end portion fixed to the underframe and an extension member coupled to the collision post and extending toward an outer side in a vehicle width direction, and the buffer member is coupled to the extension member.

6. The railcar according to claim 1, wherein the front surface frame includes at least two collision posts each extending in a vertical direction and having a lower end portion fixed to the underframe and a side post member extending in a vehicle width direction and coupling the two collision posts to each other, and the buffer member is coupled to the side post member.

7. The railcar according to claim 1, wherein:
the underframe includes a center sill located at a substantially center position in a left-right direction and extending in a front-rear direction;
the center sill includes a bending accelerating portion at a front portion thereof; and
the bending accelerating portion is formed such that a cross-sectional area of a cross section thereof perpendicular to the front-rear direction is smaller than that of an adjacent portion.

8. The railcar according to claim 1, further comprising a supporting member fixed to the underframe and configured to support a vehicle interior side end portion of the buffer member, wherein:
the underframe includes a center sill located at a substantially center portion in a left-right direction and extending in a front-rear direction, a side sill located on an outer side in the left-right direction and extending in the front-rear direction, and a cross beam extending in the left-right direction and coupled to the center sill and the side sill;
the supporting member is fixed to the cross beam;
the cross beam includes therein reinforcing board members perpendicular to the left-right direction; and
the reinforcing board members are disposed at positions corresponding to both left and right end of the supporting member.

9. The railcar according to claim 1, further comprising:
a supporting member fixed to the underframe and configured to support a vehicle interior side end portion of the buffer member; and
a lateral falling preventing member provided at least one of an outer side and inner side of the supporting member in a left-right direction to prevent the supporting member from falling over.

10. A railcar comprising:
an underframe;
a collision post located at a front surface portion of a carbody, extending in a vertical direction, and having a lower end portion fixed to the underframe;
a first impact absorbing region provided at an upper portion of the carbody to deform and absorb an impact load in a vehicle collision; and
a second impact absorbing region including a buffer member and configured to deform and absorb the impact load in the vehicle collision, the buffer member having one end coupled to the collision post, extending from the collision post toward a vehicle interior side, and located at a position higher than the underframe.

11. The railcar according to claim 10, wherein the second impact absorbing region starts deforming when the second impact absorbing region receives an impact load larger than that applied to the first impact absorbing region.

12. The railcar according to claim 11, further comprising a driver's cab including a driver's seat, wherein:
the first impact absorbing region is provided at the carbody above the driver's cab; and
the second impact absorbing region is provided in front of the driver's seat.

\* \* \* \* \*